United States Patent Office
3,512,361
Patented May 19, 1970

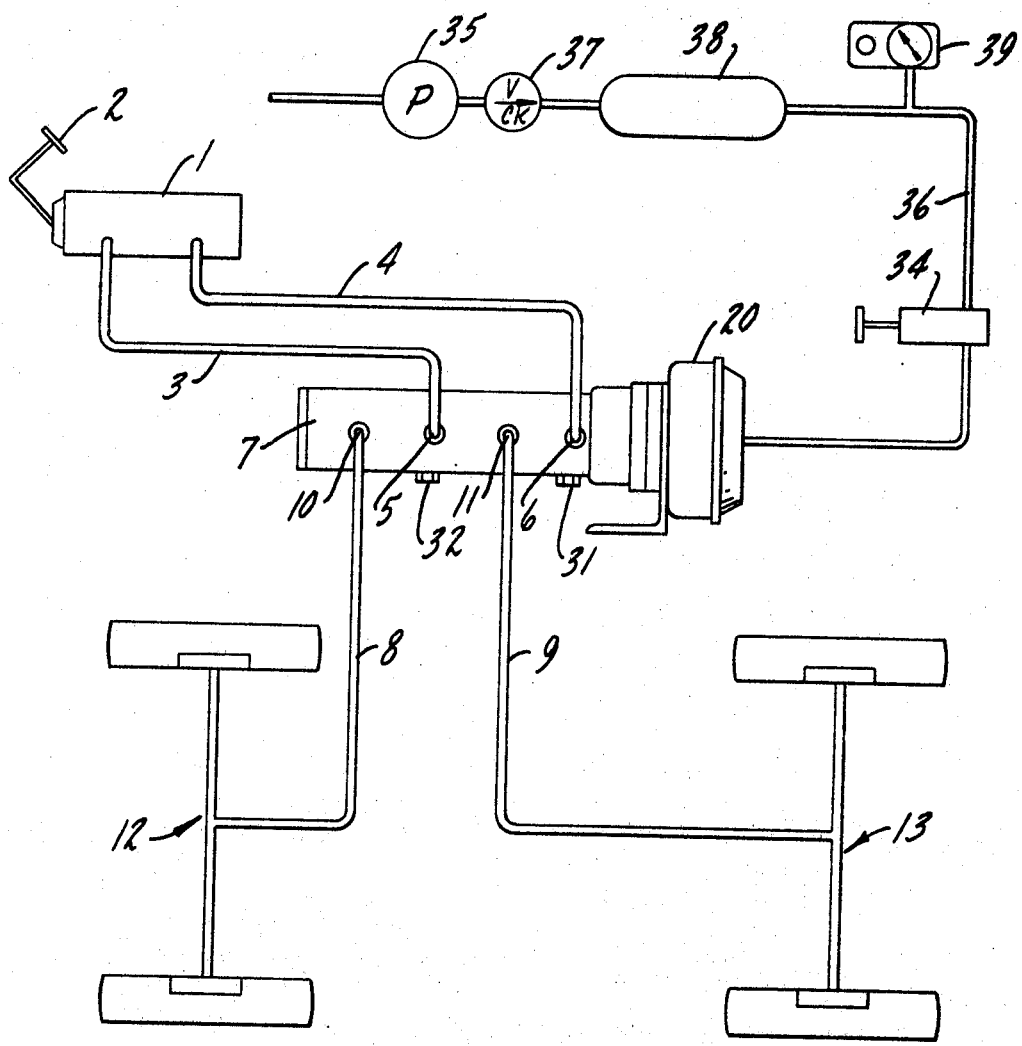

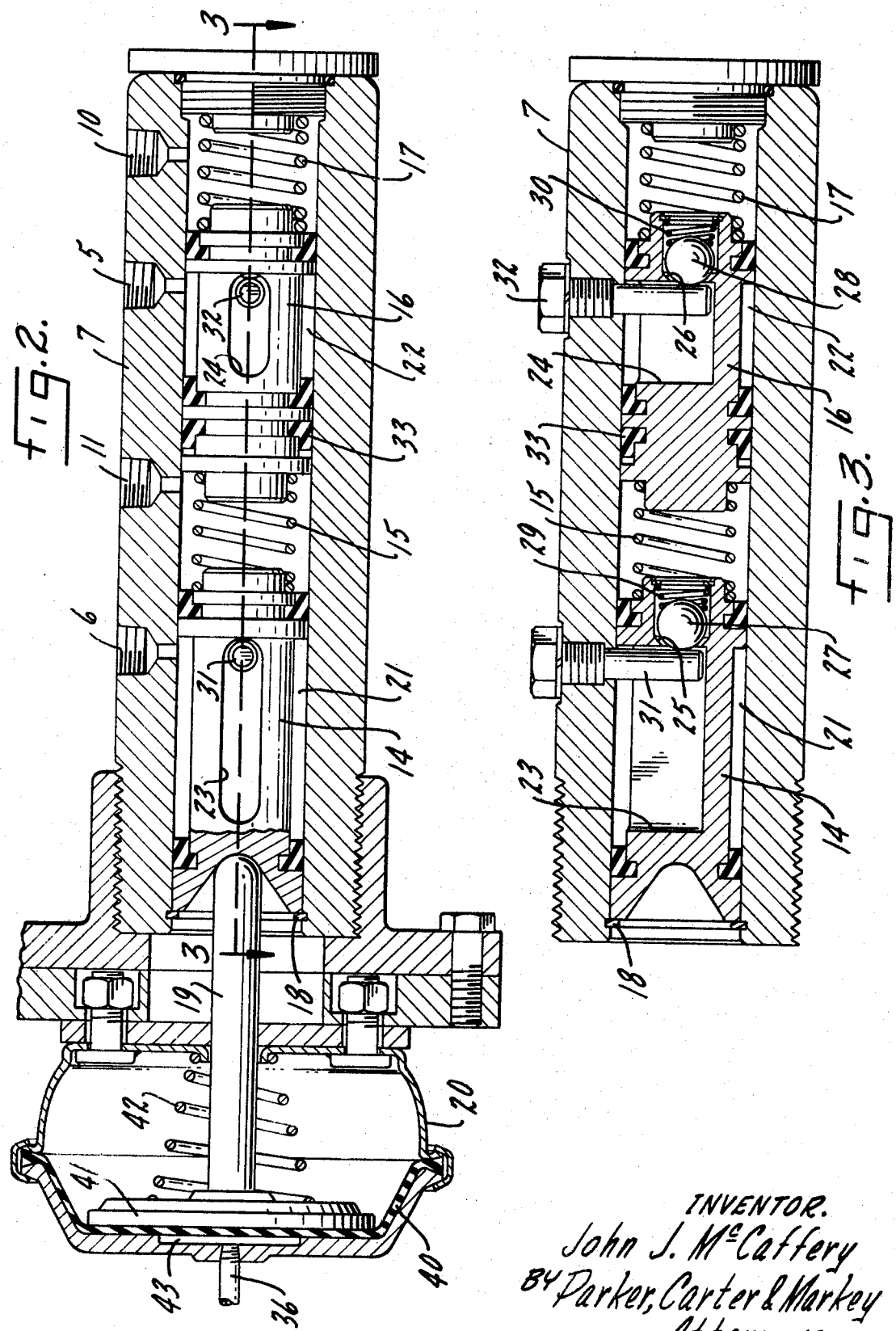

3,512,361
PNEUMATIC-HYDRAULIC SYSTEM FOR AUTOMOTIVE VEHICLE BRAKES AND THE LIKE
John J. McCaffery, Orinda, Calif., assignor to Stromberg Hydraulic Brake and Coupling Company, Chicago, Ill., a corporation of Illinois
Filed Dec. 23, 1968, Ser. No. 785,996
Int. Cl. F15b 7/00, 7/08
U.S. Cl. 60—54.5                    5 Claims

ABSTRACT OF THE DISCLOSURE

A hydraulic pressure system applicable, but not limited to automotive vehicle dual brake systems and the like, including a manually actuated master cylinder and slave or brake cylinders, the latter being arranged in separate groups, a hydraulic connection between the master cylinder and each cylinder group, a single selector valve assembly in series with and adapted to control the hydraulic connection, manually controlled pneumatic means for actuating the selector valve assembly, to interrupt the connection between the slave cylinder groups and the master cylinder and to increase the hydraulic pressure in the connection between the selector valve assembly and at least one of the slave cylinder groups.

SUMMARY OF THE INVENTION

This invention includes a master cylinder which, when manually operated, discharges hydraulic fluid under pressure through a selector valve assembly to a plurality of individual slave cylinders to do work in response to the pressure generated by the master cylinder. In one position of the selector valve assembly, there is free flow of hydraulic fluid from the master cylinder to each of the slave cylinders. The selector valve assembly contains valve and pressure generating elements which, when operated in response to manually controlled pneumatic pressure, interrupt the flow between the master cylinder and the slave cylinders and supply increased hydraulic pressure to at least one of the slave cylinders quite independent of the pressure supplied others and independent of the pressure generated by the master cylinder.

This invention is well illustrated in connection with a dual automobile brake system. Hydraulic ducts lead from the automobile master cylinder to the slave or brake cylinders for the front and rear wheels of the vehicle. There may be separate ducts leading from the master cylinder to the selector valve assembly to supply pressure through the selector valve assembly to the two separate groups of brake cylinders or there may be a single duct leading from the master cylinder communicating through the selector valve assembly to each of the groups of slave cylinders.

In any event, when pneumatic pressure from a suitable pressure source is controlled by the operator, to actuate the selector valve assembly, the valve assembly immediately cuts off the connection or connections between it and the master cylinder and increases the hydraulic pressure between the selector valve assembly and each of the slave cylinder groups. If there is a break or leak in the system associated with one of the slave cylinder groups, the selector valve assembly will nevertheless provide pressure to the group where there is no break so that, in this particular case, at least half of the automotive brake effect is still available.

This system can well be applied to any situation where a plurality of slave cylinders are required to do work and the availability of pneumatic power manually controlled makes it possible to substantially increase the pressure, supplied to the slave cylinders, above the pressure which would ordinarily be provided by the master cylinder.

BRIEF DESCRIPTION OF THE DRAWINGS

The invention is illustrated more or less diagrammatically in the accompanying drawings wherein:
FIG. 1 is a diagrammatic view of the system;
FIG. 2 is a section through the selector valve assembly of FIG. 1;
FIG. 3 is a section along the line 3—3 of FIG. 2.
Like parts are indicated by like characters throughout the specification and the drawings.

DESCRIPTION OF THE PREFERRED EMBODIMENTS

The pneumatic-hydraulic system as applied to an automotive vehicle includes a manually operated or booster operated cylinder 1. In this instance, a pedal 2 is illustrated. The master cylinder as illustrated is dual. Ducts 3 and 4 lead from separate discharge ports therein to spaced inlet ports 5 and 6 in an auxiliary cylinder or selector valve assembly 7. Ducts 8 and 9 lead from outlets 10 and 11 of the selector valve assembly 7 respectively to the grouped front and rear wheel slave cylinder brake groups 12 and 13 of an automotive vehicle.

If the master cylinder is not dual, the duct 4 will be omitted and duct 3 will be connected to ports 5 and 6.

When the selector valve assembly is in the starting position, as will hereinafter appear, there is a free path for the hydraulic fluid from the master cylinder to the front and rear wheel brake groups, but when the selector valve assembly is moved from the neutral position, the connection between it and the master cylinder is cut off and pressure is applied to the slave cylinders independent of the pressure applied by the master cylinder.

The selector valve assembly 7 is closed at one end, open at the other and contains, in alignment, a power piston 14, a floating spring 15, a floating piston 16 and a retracting or return spring 17. Withdrawal of the assembly from the cylinder is inhibited by a removable abutment or piston stop 18. A push rod 19 penetrates the open end of the cylinder to engage the power piston 14 so that, when pressure is applied by the pneumatic motor 20, the power piston is moved inwardly as will hereafter appear.

Suitable packing cups are provided for each end of each of the pistons. Each piston is reduced intermediate its ends intermediate the packing cups to provide clearances 21 and 22 between the pistons 14 and 16 and the inner wall of the cylinder.

Each piston is slotted as at 23 and 24 in communication with the clearances 21 and 22 respectively and the outboard end of each piston is apertured to define valve seats 25 and 26 engaged by ball valves 27 and 28 seated by valve springs 29 and 30. Stop pins 31 and 32 in the wall of the cylinder 7 penetrate the slots 23 and 24 and when the pistons are in retracted position, the ball valves are unseated by the stop pins. The slot 23 is longer than the slot 24 as will hereafter appear.

There is a separate packing 33 associated with the floating piston to ensure that pressure generated by the power piston cannot pass the floating piston.

In the inactive position, the retracting spring 17 exerts pressure on the floating piston 16. The floating piston, through the floating spring 15, holds the power piston 14 against the abutment 18. The retracting spring not being strong enough to compress the floating spring 15, there is a clear hydraulic passage through the auxiliary cylinder for both of the dual brake systems. Hydraulic pressure can through inlet 6, clearance 21, slot 23 in the piston 14, through valve seat 25 and out through outlet 11 for one of the brake slave cylinder assemblies, and the same situation prevails with respect to the other assembly or group with hydraulic fluid entering through port 5, clearance 22, slot 24 in piston 16, valve seat 26, exhaust port 10.

When pressure is applied to the push rod 19, the entire assembly moves forward. The ball valves 27 and 28 leave the stop pins 31 and 32 and are seated simultaneously by the springs 29 and 30 respectively. This cuts off connection between the selector valve assembly 7, or the auxiliary control, and the master cylinder, and compresses the return spring as the floating piston 16 applies pressure in the cylinder to force hydraulic fluid out through the port 10. Depending on spring constants, as soon as the pressure applied by the power piston exceeds the resistance of the floating spring 15 and the resistance to movement of the floating piston, further movement of the power piston 14 compresses the floating spring 15 and the power piston approaches the floating piston 16 to apply hydraulic ressure for fluid discharge through the outlet 11. This pressure may build up a little later than the pressure through outlet 10 and as a result this pressure will be a little lower during buildup than the pressure discharged through outlet 11. This may be advantageous when it is desired to have higher pressure on the brake system at one end of the vehicle before the other end.

The travel of the power piston 14 is preferably somewhat longer than the travel of the floating piston 16. Therefore, the slot 23 in the power piston 14 is enough longer to permit such differential travel. Another reason for this longer slot is that, if there should be a failure in one or other of the brake systems, such failure can be compensated for by excessive travel of the power piston.

When the operator wishes to apply greater pressure to the slave cylinders than can be generated by the master cylinder, he opens the valve 34 to supply pneumatic pressure to the pneumatic motor 20, thus moving the selector valve elements into position to shut off communication with the master cylinder and cause the pistons to supply added pressure to the ducts leading to the slave cylinders.

The pump 35, which may, for example, be a vacuum operated air pump connected into the engine intake manifold, supplies pneumatic pressure through duct 36 past pressurestat 37 to reservoir 38, past pressure gauge 39, through manual control valve 34, which is preferably located at the operator's station, to the motor 20.

The pistons 14 and 16 are pressure generating elements and contain the valve elements 25, 26, 27 and 28.

The pneumatic motor 20 encloses an elastomeric diaphragm 440 with pressure plate 41 urged away from the selector valve assembly by spring 42. When pneumatic pressure from duct 36 enters the air chamber 43, it urges the diaphragm 40 toward the selector valve assembly to apply, through push rod 19, the pressure to actuate the valve and the pressure generating elements.

It should also be noted that the aforesaid system enables a single line brake system to be split, thereby providing axle by axle protection. Whether a single or dual primary pressure source is utilized, however, the above described system will function to bring the vehicle to a controlled stop in the event of failure in one of the axle systems. If, for example, a failure occurs in the axle system associated with outlet 10, the drop in pressure to the right of floating piston 16 as viewed in FIGS. 2 and 3 will cause piston 16 to move to a position in which outlet 10 is isolated from inlet 5 and further loss of fluid in line 8 avoided.

It will further be noted that, in addition to functioning as a means for increasing single or multiple brake system pressures under emergency conditions, the above described system may be used as an operational holding brake. Thus, if a heavy truck is parked on an incline, the operator may, if desired, increase the pressure in the axle systems by suitable manipulation of valve 34.

The details of the double floating piston arrangement shown in FIGS. 2 and 3 are taken from copending application Ser. No. 525,712, now Pat. No. 3,436,917, issued Apr. 8, 1969 in the name of Henry E. Branson.

Although a specific embodiment of the invention has been illustrated and described, and variations described, it will at once be apparent to those skilled in the art that modifications may be made.

I claim:

1. A hydraulic pressure system, including a manually actuated master cylinder, adapted to discharge hydraulic fluid under pressure, a selector valve assembly, a plurality of slave cylinders, hydraulic connections between the master and slave cylinders through the selector valve assembly, including a plurality of separate ducts leading from the selector valve assembly to individual slave cylinders, the selector valve assembly including a plurality of valve elements and pressure generating elements, means for biasing the valve elements to open position to permit uninterrupted hydraulic flow between the master cylinder and the slave cylinders, a pneumatic motor, a driving connection between it and the selector valve assembly, means for manually energizing the motor to overcome the bias, move the valve elements into position to close the hydraulic connection between the selector valve assembly and the master cylinder and to actuate the pressure generating elements to force hydraulic fluid under pressure toward the slave cylinders.

2. The device of claim 1 characterized by the fact that each pressure generating element is hydraulically separate and independently supplies hydraulic pressure to independent slave cylinders.

3. The device of claim 1 characterized by the fact that the pressure generating elements in the selector valve assembly are effective to supply pressure to the slave cylinders independent of failure in the supply of hydraulic pressure to the selector valve assembly.

4. The device of claim 1 characterized by the fact that each of the hydraulic connections between the selector valve assembly and the slave cylinders is operative independent of the pressure in any other of the connections.

5. In a hydraulic pressure system, a source of pressure, a brake system, said brake system having a hydraulic duct extending from the source of pressure to associated braking means, such as an axle brake system on a vehicle, and means for increasing the pressure in said brake system, said means including a valve assembly connected in series with the pressure source and the brake system, said valve assembly being located in the aforesaid hydraulic duct and adapted to permit free flow of hydraulic fluid therethrough from the pressure source to the brake system upon normal actuation of the pressure source, a pneumatic motor, said pneumatic motor having a power connection to the valve assembly which, when actuated, increases the pressure in that portion of the hydraulic duct between the valve assembly and the brake system, and means for actuating the pneumatic motor, said actuating means including a source of pneumatic pressure, a line between said pneumatic pressure source and the pneumatic motor and a controller in the line operable, when actuated, to connect the source of pneumatic pressure to the pneumatic motor.

References Cited

UNITED STATES PATENTS 3,358,447  12/1967  Branson.
3,434,285  3/1969   Hager.
3,436,917  4/1969   Branson.

MARTIN P. SCHWADRON, Primary Examiner

R. R. BUNEVICH, Assistant Examiner

U.S. Cl. X.R.

60—54.6